(12) United States Patent
Bodin et al.

(10) Patent No.: US 6,315,087 B1
(45) Date of Patent: Nov. 13, 2001

(54) DISC BRAKE ARRANGEMENT

(75) Inventors: Jan-Olof Bodin, Alingsås; Ingemar Dagh, Gothenburg, both of (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/284,060

(22) PCT Filed: Oct. 3, 1997

(86) PCT No.: PCT/SE97/01662

§ 371 Date: Apr. 30, 1999

§ 102(e) Date: Apr. 30, 1999

(87) PCT Pub. No.: WO98/15752

PCT Pub. Date: Apr. 16, 1998

(30) Foreign Application Priority Data

Oct. 7, 1996 (SE) .................................................... 9603654

(51) Int. Cl.$^7$ ..................................................... F16D 65/14
(52) U.S. Cl. ........................................................ 188/73.45
(58) Field of Search .............................. 188/73.45, 73.39, 188/73.34, 73.43

(56) References Cited

U.S. PATENT DOCUMENTS

| | | |
|---|---|---|
| 2,894,607 | 7/1959 | Butler . |
| 3,677,372 | 7/1972 | Burnett . |
| 3,841,446 | 10/1974 | Gravel, Jr. . |
| 4,319,670 | 3/1982 | Oka et al. . |
| 4,360,079 | 11/1982 | Belart . |
| 4,461,372 | 7/1984 | Bekkala et al. . |
| 5,188,202 * | 2/1993 | Terashima .......................... 188/73.45 |
| 5,860,496 * | 1/1999 | Kullman ............................ 188/73.45 |
| 6,062,349 * | 5/2000 | Boisseau ............................ 188/73.45 |

\* cited by examiner

*Primary Examiner*—Christopher P. Schwartz
*Assistant Examiner*—Cliff Bartz

(57) ABSTRACT

Disc brake arrangement including a bracket adapted to be fixed to a vehicle and a brake caliper support securely mounted thereon. The bracket is made with semi-circular seats and the caliper support with cylindrical pins which are arranged so that the caliper support is held in place on the bracket by the force of gravity when the pins are received in their seats. The screw holes for the mounting screws in the caliper support coincide with corresponding screw holes in the bracket.

6 Claims, 1 Drawing Sheet

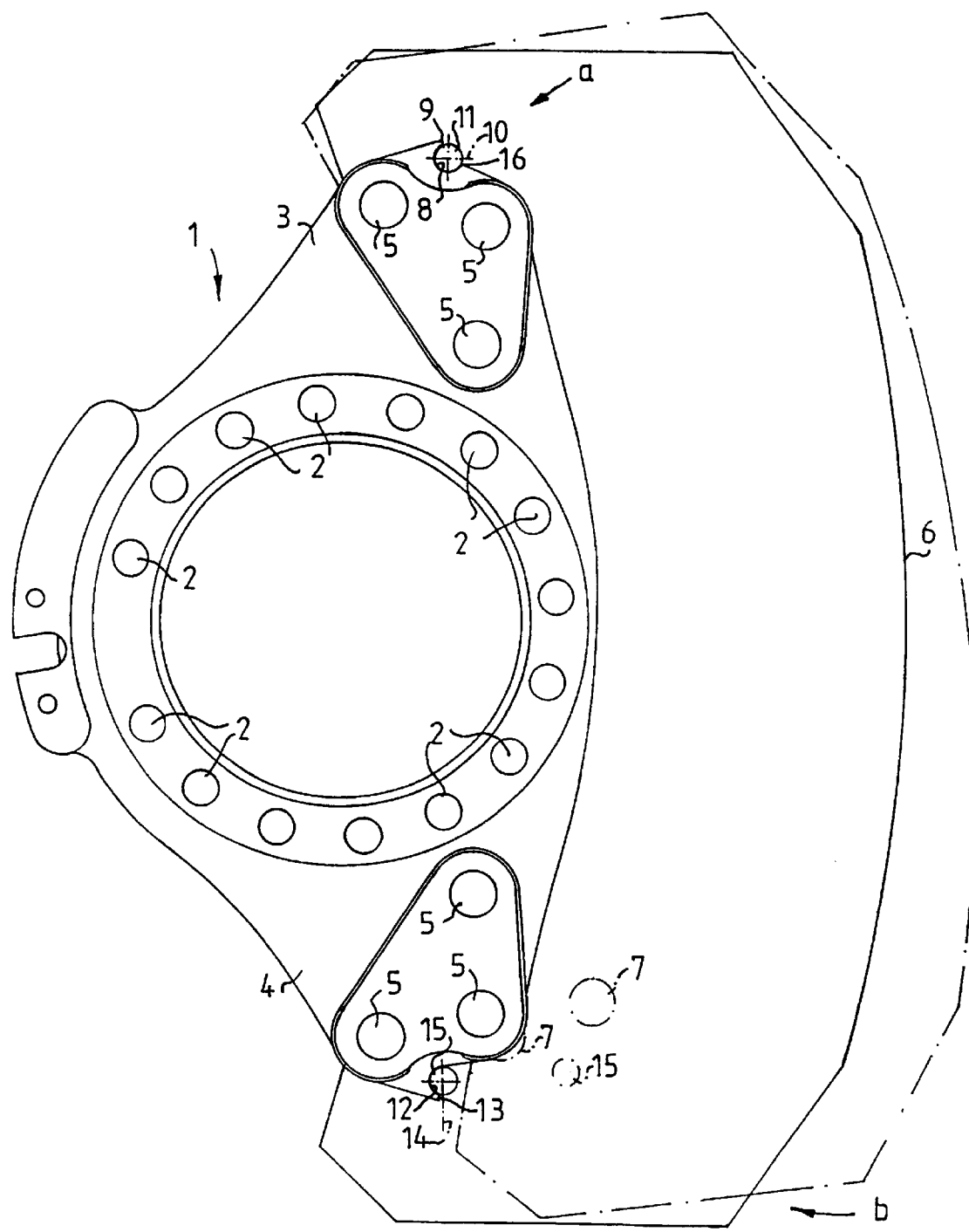

DISC BRAKE ARRANGEMENT

BACKGROUND OF THE INVENTION

The present invention relates to a disc brake arrangement for a vehicle wheel, comprising a bracket member designed to be mounted on a vehicle member, relative to which the wheel is rotatably mounted, a brake caliper member and means for positioning the brake caliper member relative to the bracket member.

This brake caliper member can be the support for a brake caliper of floating (sliding) type, which is movably mounted in the support. When the piston means press against the brake lining on one side of the brake disc, the brake caliper is displaced by the reactive force relative to the support so that the caliper arm is pressed against the brake lining adjacent the opposite side of the brake disc. When the brake disc is mounted on a wheel axle, the support is normally lifted manually into place without any particular aids and is fixed by means of bolts to a fixed vehicle part, e.g. a so-called adapter plate, which is solidly mounted around the wheel hub. In doing this, the installer must hold the caliper so that its bolt holes coincide with the corresponding bolt holes in the adapter plate, and hold up the caliper at least until the first two bolts are inserted into place. Then they function as means for positioning the brake caliper member relative to the adapter plate, so that the installer does not need to hold the caliper when the other bolts are screwed into place. The installation of the fixed portion of a floating type brake caliper for a passenger car can be done without any problems, since the brake caliper is relatively light and thus can be aligned and supported with one hand while the bolts are inserted into the bolt holes with the other hand.

The support for a sliding (floating) brake caliper for a heavy truck is, however, large and heavy. The weight makes it very difficult for a single installer to both align the bolt holes of the brake caliper with the holes in the adapter plate and to hold the caliper in this position while at least the first two bolts are inserted into their holes.

SUMMARY OF THE INVENTION

The purpose of the present invention is to achieve a disc brake arrangement of the type described by way of introduction which is constructed so that the support, for example, for a sliding brake caliper member for heavy vehicles can be easily mounted by one installer.

This is achieved according to the invention by virtue of the fact that one of the bracket member and the brake caliper member has first and second spaced guide pins and the other one of the bracket member and the brake caliper member has first and second seats for respective pins, that the first pin and the first seat are made and oriented in relation to each other so that the first pin can be received in the first seat when the brake caliper member and the bracket member have a predetermined relative position, and that the second pin and the second seat are so made and oriented relative to each other and to the first pin and the first seat, that—after the first pin has been received in the first seat—the brake caliper member can be swung about the pivot axis of the first pin to a position in which the second pin rests in the second seat and in which the brake caliper member is fixed relative to the bracket member by the force of gravity.

When the pins rest in their seats, the screw holes for the mounting screws in the brake caliper member coincide with corresponding screw holes in the bracket member. When mounting a brake caliper which is to be fixed in essentially vertical position, the upper pin is first put in its seat while the lower portion of the brake caliper member is kept in a position somewhat swung out from the lower portion of the bracket member. The installer then allows the caliper to swing by gravity in towards the bracket member so that the lower pin swings into the lower seat. The brake caliper member is now held relative to the bracket member only by the effect of gravity and the installer can concentrate entirely on mounting the screws in place.

BRIEF DESCRIPTION OF THE DRAWINGS

The invention will described in more detail below with reference to the example shown in the accompanying drawing, where the figure shows a side view of a so-called adapter plate for a vehicle rear axle and a schematic representation of a fixed portion of a sliding (floating) brake caliper mounted on the adapter plate.

DESCRIPTION OF THE PREFERRED EMBODIMENTS

In the figure, 1 designates the bracket member which is an adapter plate with a number of screw holes 2 for mounting screws (not shown), by means of which the adapter plate 1 is designed to be fixed in a known manner to a rear axle casing (not shown) of a truck.

The adapter plate 1 is made with upper and lower mounting flanges 3 and 4, respectively, each of which has three through-screw holes 5, for screws (not shown) for fixing the stationary support 6 of a sliding (floating) brake caliper of a disc brake. The brake caliper support 6 has through-screw holes 7 which in the position of the support 6 shown in the figure coincide with the screw holes 5.

According to the invention, the upper mounting flange 3 is provided with a semicircular seat 8, which extends over less than 75% of a complete circle so that the upper edge 9 of the seat lies above a horizontal center plane designated 10. The seat 8 receives a cylindrical pin 11, the diameter of which is so much smaller than the diameter of the seat 8 that the pin 11, with the least possible clearance can be received into the seat 8 from the side in the direction of the arrow a. The lower mounting flange 4 is made with a semi-circular seat 12 which extends over less than half the complete circle and has a lower edge 13, which lies immediately to one side of a vertical center plane designated 14. The seat 12 has the same diameter as the seat 8 and receives a cylindrical pin 15 of the same diameter as the pin 11.

When mounting the brake caliper support 6 on the adapter plate 1, the upper pin 11 is moved with the caliper support inclined, as indicated in the figure with the dash-dot line, in the direction of the arrow a into the seat 8, whereafter the caliper support 6 is swung in the direction of the arrow b about the pivot axis of the upper pin until the lower pin 15 rests in the lower seat 12, as shown with the solid lines in the figure. In this position, the brake caliper support 6 is held in place relative to the adapter plate 1 by the force of gravity so that the installer has both hands free to screw on the brake caliper support. In the embodiment shown with a vertically oriented caliper support and the position shown of the seats and pins, a requirement for the function described is that the upper seat 8 has a lower edge 16 and that the edge 13 of the lower seat 12 does not prevent the pin 15 from being swung in. Suitably, the lower seat covers at most one half of the periphery of the pin 15.

The invention is, of course, not limited to the vertical mounting of the brake caliper support 6 shown and the relative placement of the pins 11,15 and the seats 8,12 dictated thereby but encompasses all conceivable placements of the brake caliper support 6 relative to the adapter plate 1 and other relative placements of the pins and seats dictated thereby. As an equivalent alternative, the pins can, of course, be mounted on the adapter plate 1 and the seats be arranged on the brake caliper support.

What is claimed is:

1. A disc brake arrangement comprising:

a bracket adapted to be fixed to a vehicle; and a brake caliper member;

one of said bracket and said brake caliper member comprising first and second guide pins affixed thereto and the other of said bracket and said brake caliper member comprising first and second seats that each receive a respective one of said first and second guide pins, said first guide pin and said first seat being structured so that said first guide pin is received in said first seat when said brake caliper member and said bracket have a first relative position in which said second guide pin is spaced from said second seat, said second guide pin and said second seat being structured so that said second guide pin is received in said second seat when said brake caliper member is pivoted about said first guide pin to a second relative position in which said first guide pin is in said first seat and said second guide pin is in said second seat, said brake caliper member being fixed in said second relative position by gravity, and said bracket and said brake caliper member each comprising screw holes that are in registration when said brake caliper member and said bracket are in said second relative position.

2. The disc brake arrangement of claim 1, wherein said first and second guide pins are cylindrical and have parallel longitudinal axes and said first and second seats have partially circular depressions that correspond to the cylindrical shapes of said first and second guide pins.

3. The disc brake arrangement of claim 1, wherein when said bracket is oriented with said first seat above said second seat and when said bracket and said brake caliper member are in said second relative position, said brake caliper member is suspended from said first guide pin and blocked from further pivoting toward said bracket by said second guide pin.

4. The disc brake arrangement of claim 1, wherein said first and second guide pins are affixed to said brake caliper member.

5. A disc brake arrangement comprising:

a bracket adapted to be fixed to a vehicle; and a brake caliper member;

one of said bracket and said brake caliper member comprising first and second guide pins affixed thereto and the other of said bracket and said brake caliper member comprising first and second seats that each receive a respective one of said first and second guide pins, said first guide pin and said first seat being structured so that said first guide pin is received in said first seat when said brake caliper member and said bracket have a first relative position in which said second guide pin is spaced from said second seat, and said second guide pin and said second seat being structured so that said second guide pin is received in said second seat when said brake caliper member is pivoted about said first guide pin to a second relative position in which said first guide pin is in said first seat and said second guide pin is in said second seat, said brake caliper member being fixed in said second relative position by gravity, wherein said first seat opens away from said second seat and encompasses at least half a circumference of said first guide pin and said second seat opens toward said brake caliper and encompasses no more than half a circumference of said second guide pin.

6. The disc brake arrangement of claim 5, wherein said first seat encompasses more than half the circumference of said first guide pin.

* * * * *